US009015422B2

(12) United States Patent
Meier et al.

(10) Patent No.: US 9,015,422 B2
(45) Date of Patent: Apr. 21, 2015

(54) ACCESS MAP-PATTERN MATCH BASED PREFETCH UNIT FOR A PROCESSOR

(71) Applicant: Apple Inc., Cupertino, CA (US)

(72) Inventors: Stephan G. Meier, Los Altos, CA (US); Gerard R. Williams, III, Los Altos, CA (US); Hari S. Kannan, Sunnyvale, CA (US); Pavlos Konas, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 13/942,780

(22) Filed: Jul. 16, 2013

(65) Prior Publication Data

US 2015/0026413 A1    Jan. 22, 2015

(51) Int. Cl.
*G06F 12/08* (2006.01)
(52) U.S. Cl.
CPC .... *G06F 12/0862* (2013.01); *G06F 2212/6026* (2013.01)
(58) Field of Classification Search
CPC ............... G06F 12/08; G06F 12/0862; G06F 2212/6026
USPC .......................................... 711/137, 156, 158
See application file for complete search history.

(56) References Cited

U.S. PATENT DOCUMENTS

| 5,305,389 | A | | 4/1994 | Palmer | |
|---|---|---|---|---|---|
| 6,151,662 | A | * | 11/2000 | Christie et al. | 711/145 |
| 6,970,985 | B2 | * | 11/2005 | Moritz | 711/154 |
| 7,493,607 | B2 | * | 2/2009 | Moritz | 717/151 |
| 7,975,108 | B1 | | 7/2011 | Holscher et al. | |
| 8,627,009 | B2 | * | 1/2014 | Mekhiel | 711/122 |
| 8,856,447 | B2 | * | 10/2014 | Williams, III | 711/122 |
| 2008/0016330 | A1 | | 1/2008 | El-Essawy et al. | |

FOREIGN PATENT DOCUMENTS

EP    0402787    12/1990

OTHER PUBLICATIONS

Yasuo Ishii, et al, "Access Map Pattern Matching Prefetch: Optimization Friendly Method", University of Tokyo, 2009, pp. 1-5.

(Continued)

*Primary Examiner* — Stephen Elmore
(74) *Attorney, Agent, or Firm* — Meyertons, Hood, Kivlin, Kowert & Goetzel, P.C.; Lawrence J. Merkel (57) ABSTRACT

In an embodiment, a processor may implement an access map-pattern match (AMPM)-based prefetcher in which patterns may include wild cards for some cache blocks. The wild card may match any access for the corresponding cache block (e.g. no access, demand access, prefetch, successful prefetch, etc.). Furthermore, patterns with irregular strides and/or irregular access patterns may be included in the matching patterns and may be detected for prefetch generation. In an embodiment, the AMPM prefetcher may implement a chained access map for large streaming prefetches. If a stream is detected, the AMPM prefetcher may allocate a pair of map entries for the stream and may reuse the pair for subsequent access map regions within the stream. In some embodiments, a quality factor may be associated with each access map and may control the rate of prefetch generation.

20 Claims, 7 Drawing Sheets

(56) References Cited

OTHER PUBLICATIONS

Yasuo Ishii, et al "Access Map Pattern Matching for High Performance Data Cache Prefetch" Tokyo, Japan, Published Jan. 2011, pp. 1-24.

International Search Report and Written Opinion from PCT/US2014/042633, issued Oct. 9, 2014, Apple Inc., pp. 1-9.

* cited by examiner

```
              AP
       A A │A│P P           Unit Stride, Forward
    A . A .│A│. P . P       Non-unit, Regular Stride, Forward
48 ─────  P P│A│A A         Unit Stride, Backward
      A * * *│A│P           Wildcards
A A . . A .│A│P P . P P     Irregular Pattern, Forward
A . A A . │A│. P P          Irregular Pattern, Forward
```

<u>Fig. 3</u>

```
           AP
    A . . *│A│P     Wildcard Pattern
    A . . A│A│      Matching Access Map 1
    A . . S│A│      Matching Access Map 2
    A . . P│A│      Matching Access Map 3
    A . . .│A│      Matching Access Map 4
```

ACCESS MAP-PATTERN MATCH BASED PREFETCH UNIT FOR A PROCESSOR

BACKGROUND

1. Field of the Invention

This invention is related to prefetch mechanisms in processors.

2. Description of the Related Art

Processors continue to be produced with both higher operating frequencies and higher average number of instructions executed per clock cycle (IPC). Memory latency, on the other hand, has only decreased at a much slower rate. Accordingly, processors are often stalled awaiting instructions and/or data from memory. In order to improve performance, processors typically include one or more levels of caching. Data stored in the cache may be available at a much lower latency than data from memory. Accordingly, cache hits may be provided with low latency and may improve performance of the processors. Cache misses are fetched from memory and incur the higher memory latencies.

In an attempt to reduce the effective memory latency even further, processors can implement prefetching. Generally, prefetching involves predicting which cache blocks the processor will need to access soon, and initiating the memory read for the cache blocks prior to such accesses being generated via instruction code execution in the processor. If the prefetching successfully reads cache blocks that are later accessed by the processor, memory latency is reduced because the accesses are cache hits instead of cache misses. On the other hand, inaccurate prefetching can cause useful data to be removed from the cache and the inaccurately prefetched data is not accessed, which reduces performance. Additionally, even if performance is not adversely affected or improved by a small amount, excess power consumed by the processor to perform the prefetching might not be justified. Particularly, in portable devices in which the available energy is limited (e.g. from a battery), the excess power consumption can reduce battery life.

SUMMARY

In an embodiment, a processor may implement an access map-pattern match (AMPM)-based prefetcher with features designed to improve prefetching accuracy and/or reduce power consumption. In an embodiment, the access patterns that are matched to the access maps may include wild cards for some cache blocks in the pattern. The wild card may match any access for the corresponding cache block (e.g. no access, demand access, prefetch, successful prefetch, etc.). Embodiments which implement out-of-order execution may generate the cache accesses in different orders than the original code sequence, or even in different orders on different executions depending on the execution of other instructions in the processor. These variations effectively create "noise" in the access maps that the wild cards may filter out. Additionally, wild cards may be used when a code sequence accesses cache blocks in an unusual pattern, but ultimately accesses a regular pattern of the cache blocks. Furthermore, in some embodiments, patterns with irregular strides and/or irregular access patterns may be included and may be detected for prefetch generation.

In an embodiment, the AMPM prefetcher may implement a chained access map for large streaming prefetches. If a stream is detected, the AMPM prefetcher may allocate a pair of map entries for the stream and may reuse the pair for subsequent access map regions within the stream. Such features may prevent a large stream from overwriting numerous entries in the AMPM prefetcher, and other potentially useful access maps that are not related to the stream may thus be retained.

In some embodiments, a quality factor may be associated with each access map. The quality factor may be an indication of how well a matched pattern is actually predicting the accesses in the access map. The quality factor may be used to control the rate of prefetch generation when the prefetching is not as accurate as may be desirable.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Processor Overview

Figure 1:
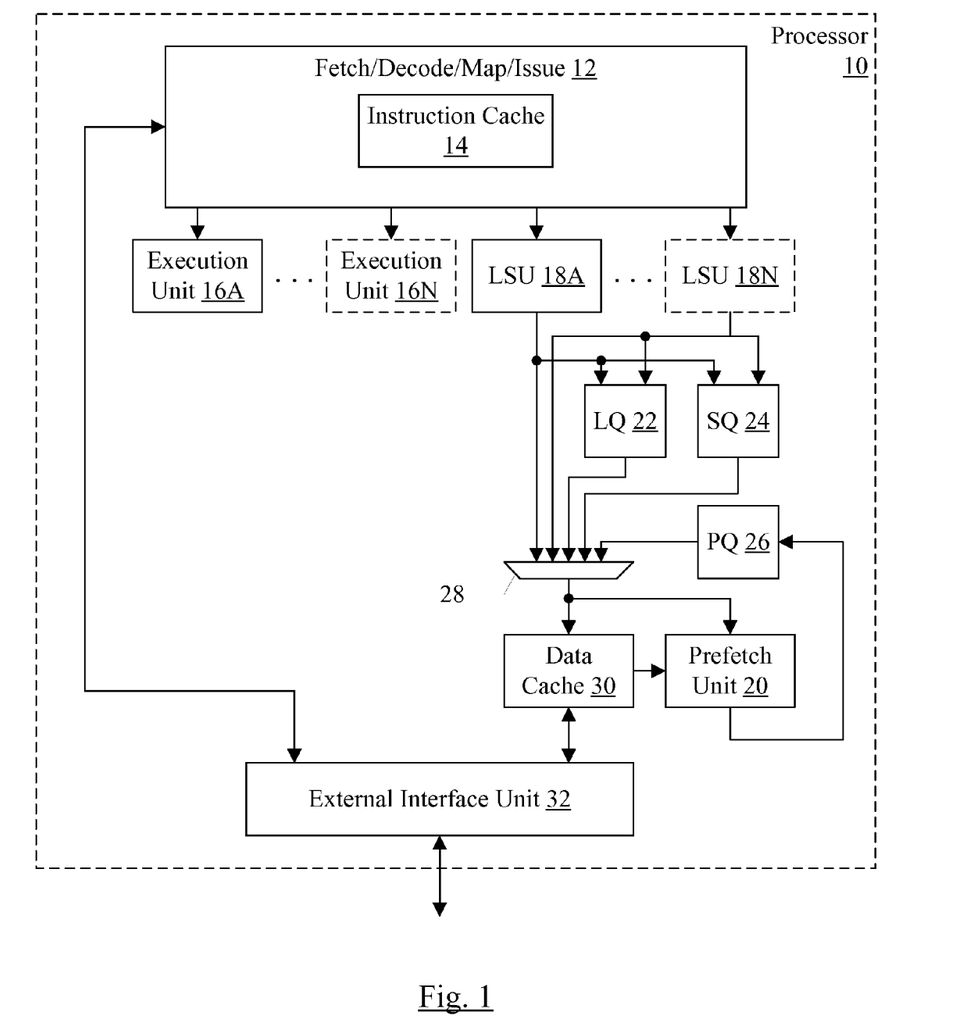
FIG. 1 is a block diagram of one embodiment of a processor.

Turning now to FIG. 1, a block diagram of one embodiment of a processor 10 is shown. In the embodiment of FIG. 1, the processor 10 may include a fetch/decode/map/issue (FDMI) unit 12 that may include an instruction cache 14. The processor 10 may further include one or more execution units 16A-16N, one or more load/store units (LSUs) 18A-18N, a prefetch unit 20, a load queue (LQ) 22, a store queue (SQ) 24, a prefetch queue (PQ) 26, a multiplexor (mux) 28, a data cache 30, and an external interface unit 32. The data cache 30 and the FDMI unit 12 are coupled to the external interface unit 32, which is coupled to communicate external to the processor 10 (e.g. to a level 2 (L2) cache and/or to other components of a system including the processor 10). The FDMI unit 12 is coupled to the execution units 16A-16N and the LSUs 18A-18N. The LSUs 18A-18N are coupled to the load queue 22 and the store queue 24, and the prefetch unit 20 is coupled to the data cache 30 and the prefetch queue 26. The LSUs 18A-18N, the load queue 22, the store queue 24, and the prefetch queue 26 are coupled to the mux 28, which is coupled to the data cache 30 and the prefetch unit 20.

The FDMI unit 12 may be configured to fetch instructions for execution by the processor 10, decode the instructions into ops for execution, map the ops to speculative resources (e.g. rename registers) to permit out-of-order and/or speculative execution, and issue the ops for execution to the execution units 16A-16N and/or LSUs 18A-18N. More particularly, the FDMI unit 12 may be configured to cache instructions previously fetched from memory (through the external interface unit 32) in the instruction cache 14, and may be configured to speculatively fetch a speculative path of instructions for the processor 10. The FDMI unit 12 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The FDMI unit 12 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). The term "instruction operation" may be more briefly referred to herein as "op." The ops may be mapped to physical registers from the architectural registers used in the instructions, and then scheduled for issue. The scheduling may be centralized in a scheduler, or decentralized in reservation stations, in various embodiments, based on the availability of operands for each op. A register file or files (not shown in FIG. 1) may implement the physical registers of the processor 10. There may be separate physical registers for different operand types (e.g. integer, media, floating point, etc.) in an embodiment. In other embodiments, the physical registers may be shared over operand types.

The execution units 16A-16N may include any types of execution units in various embodiments. For example the execution units 16A-16N may include integer, floating point, and/or media execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Media execution units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data.

Thus, each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops.

The LSUs 18A-18N may be configured to execute load/store ops. Generally, a load op may specify a transfer of data from a memory location to a register, while a store op may specify a transfer of data from a register to a memory location. The LSUs 18A-18N may be configured to perform virtual address generation from various address operands of the load/store ops and may be configured to transmit the ops to the data cache 30 (through the mux 28) and to the load queue 22/store queue 24.

The load queue 22 may be configured to queue loads that have been executed by the LSUs 18A-18N. The loads may be queued awaiting cache fills if they miss in the data cache 30 (and/or TLB miss translation fills if translation is enabled). The loads may be queued for ordering reasons as well. Similarly, the store queue 24 may be configured to queue stores that have been executed by the LSUs 18A-18N. The stores may be queue for cache/TLB fills, to await store data from the data source operand, and/or to await non-speculative/retired state to update the data cache 30 and/or memory. In other embodiments, a combined load/store queue may be used.

The prefetch queue 26 may store prefetch requests generated by the prefetch unit 20 to access the data cache 30. The prefetch requests may be generated by the prefetch unit 20 observing the load/store ops executed by the LSUs 18A-18N. Thus, the prefetch requests may be predicted read requests generated prior to the instruction code being executed by the processor 10 actually requesting the data. In contrast, cache requests by load/store ops may be referred to as demand fetches, because they are directly specified by the execution of code, rather than predicted.

In an embodiment, the prefetch unit 20 may be an implementation of an

AMPM prefetcher with various enhancements. The AMPM prefetcher is described in more detail below. The prefetch unit 20 may monitor the demand fetches/prefetch requests selected through the mux 28 to access the data cache 30, along with cache hit/miss status from the data cache 30, to generate prefetch requests.

The data cache 30 may have any capacity and configuration. For example, set associative, fully associative, and direct mapped configurations may be used in various embodiments. The data cache 30 may be configured to cache data in cache blocks, where a cache block is a set of bytes from contiguous memory locations that are allocated and deallocated space in the cache as a unit. The cache blocks may be aligned to a cache block boundary (e.g. a 32 byte cache block may be aligned to a 32 byte boundary, a 64 byte cache block may be aligned to a 64 byte boundary, etc.). Thus, the address of a byte may be divided into a cache offset portion (the least N significant bits of the address, where $2^N$ is the size of the cache block) and a cache tag portion (the remaining address bits). In an embodiment, the data cache 30 may be virtually indexed and a translation lookaside buffer (TLB, not shown in FIG. 1) may be accessed in parallel to translate the virtual address to a physical address of a memory location in the memory.

Cache misses in data cache 30 and instruction cache 14, as well as translation accesses, non-cacheable accesses, etc. may be communicated to the external interface unit 32. The external interface unit 32 may be configured to transmit transactions to the external components in response to the various accesses generated in the processor 10. The external interface on which transactions are transmitted may have any form. For example, the external interface may be a shared bus, a point to point interconnect with packetized transactions, a full or partial crossbar, etc.

The mux 28 may select among its various inputs (the LSUs 18A-18N, the load queue 22, the store queue 24, and the prefetch queue 26) to transmit cache accesses to the data cache 30. Control logic to the mux 28 (not shown in FIG. 1) may arbitrate among the requests using any desired arbitration scheme.

It is noted that any number and type of execution units 16A-16N may be included in various embodiments, including embodiments having one execution unit and embodiments having multiple execution units. Any number of LSUs 18A-18N may be included in various embodiments as well, including one LSU and multiple LSUs. Additionally embodiments that include load units (that execute only load ops) and/or store units (that execute only store ops) may be included with or without LSUs.

Prefetch Unit

Figure 2:
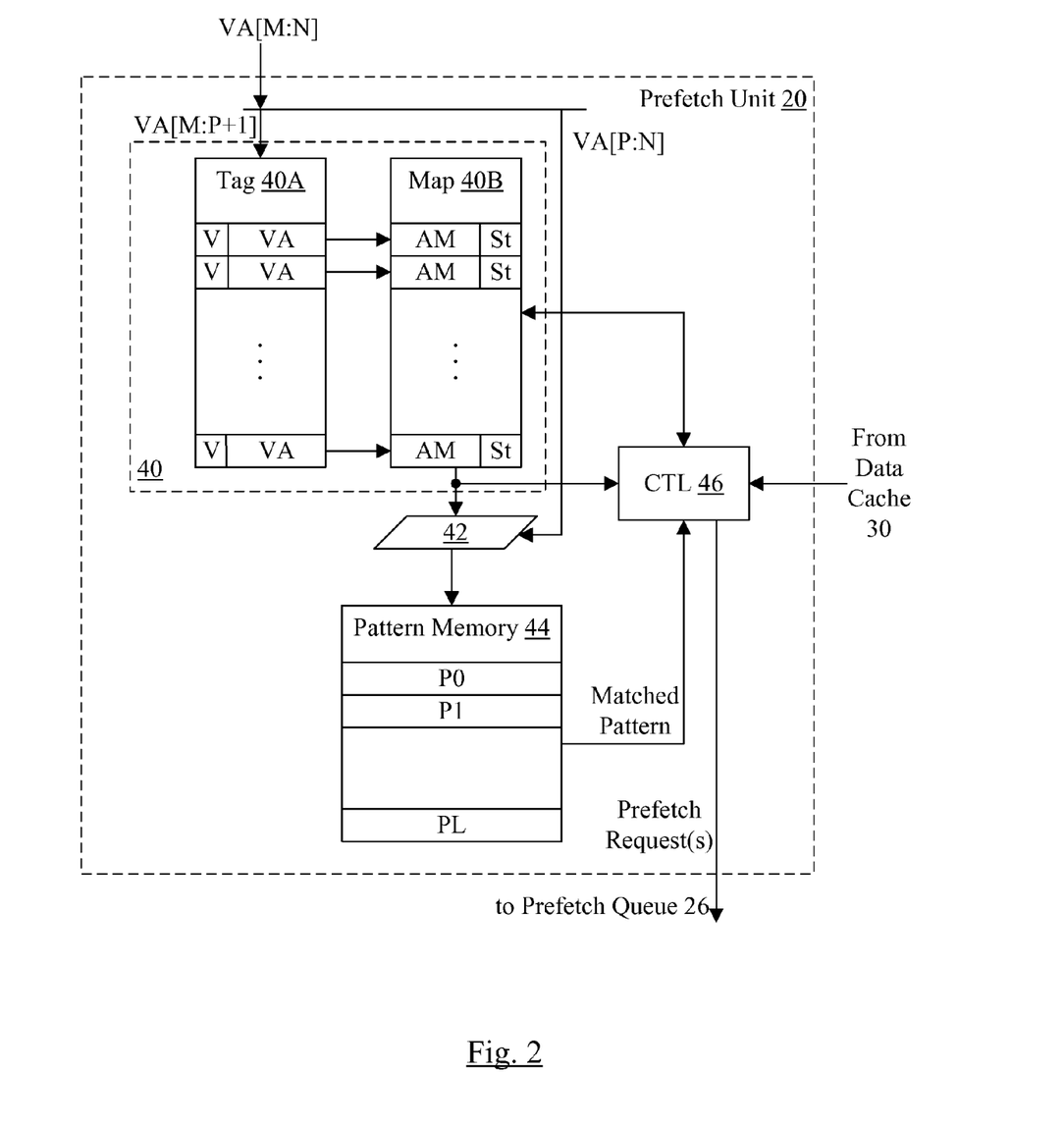
FIG. 2 is a block diagram of one embodiment of a prefetch unit shown in FIG. 1.

Turning now to FIG. 2, a block diagram of one embodiment of the prefetch unit 20 is shown. In the illustrated embodiment, the prefetch unit 20 includes an access map memory 40, a shifter 42, an access pattern memory 44, and a control circuit 46. The access map 40 and the shifter 42 are coupled to receive the virtual address of the data cache 30 access (or portions thereof, as shown in FIG. 2), and the output of the access map memory 40 is coupled to the shifter 42. The control circuit 46 is coupled to the access map memory 40, to the access pattern memory 46, to provide prefetch requests to the prefetch queue 26, and to receive cache hit/miss information from the data cache 30. The shifter 42 is coupled to the access pattern memory 44. In the illustrated embodiment, the access map memory 40 includes a tag memory 40A and a map memory 40B.

The prefetch unit 20 may be an implementation of an AMPM prefetcher. The access map memory 40 may store multiple access maps covering various access regions in the virtual address space. The access maps may represent the accesses to the cache blocks in the respective access regions. When another access hits on an access map in the access map memory 40, the access map may be output and compared to various access patterns stored in the access pattern memory 44. If a match between a given access pattern and the access map is detected, prefetch requests indicated by the matching pattern may be generated. The access patterns may be determined from trace analysis performed on various code sequences expected to be executed by the processor 10 during use. Given a certain pattern of demand accesses and/or successful prefetches, for example, one or more prefetches may be predicted based on the trace analysis. The access patterns may be identified during design of the processor 10 and hardcoded into the access pattern memory 44. Alternatively, some or all of the access patterns may be programmable in the access pattern memory 44 and may be written to the access pattern memory 44 during initialization of the processor 10 (e.g. at reset) or at some other convenient time.

As mentioned above, the access map 40 may store multiple access maps covering various access regions in the virtual address space. The access region may be a region of the virtual address space that includes multiple contiguous cache blocks. The access region may be aligned to a boundary determined by the size of the access region. For example, if access regions cover 2 kilobytes (kB) each, then the access regions are aligned to 2 kB boundaries. The access regions may be any desired size. Generally, an access map may be a record of various cache accesses that have occurred to the cache blocks within the access region. Each cache block within the access region may have an associated symbol in the access map, indicating the type of access that has occurred. In one embodiment, accesses may include demand-accessed (symbol A), prefetched (symbol P), successful prefetch (symbol S), or invalid (symbol "."). Each symbol may be represented by a different code of a value stored for the cache block in the access map. Thus, two bits per cache block may be stored based on the above symbols.

A demand-accessed cache block may be a cache block that was accessed without having been prefetched in advance. Thus, a load or store to the cache block may have been executed, and may have missed in the data cache 30. A prefetched cache block may be a cache block that was predicted to be accessed by the prefetch unit 20, which generated a prefetch request that passed through the prefetch queue 26 and was presented to the data cache 30. Alternatively, the prefetched cache block may have had a prefetch request generated and inserted into the prefetch queue 26, but may or may not have been presented to the data cache 30. A successfully prefetched cache block may be a cache block that was prefetched, and was subsequently demand-accessed in the data cache 30 (and thus the demand access hit in the data cache 30). A successfully prefetched cache block may thus be an accurately prefetched cache block, since it was accessed.

An invalid cache block in the access map may be a cache block that has not been accessed.

Accordingly, the virtual address (VA) of the data cache access (not including the N least significant bits of the address, bits N–1:0, where $2^N$ is the size of a cache block) may be input to the prefetch unit 20. The least significant P-N bits of the virtual address provided to the prefetch unit 20 may be an offset within the access map to the cache block being accessed. Thus, the access maps may cover $2^{P+1}$ bytes. The remainder of the virtual address, bits M:P+1, may be a tag that may be compared to the tags in the tag memory 40A.

The tag memory 40A may include multiple entries, each entry storing a tag for a corresponding access map in the map memory 40B. In an embodiment, the access map memory 40 may be fully associative and thus the tag memory 40A may be content addressable memory (CAM). If a match is detected between the VA tag input to the access map memory 40 and an entry in the CAM 40A (and the valid bit is set), a hit is detected on the entry. A corresponding entry in the map memory 40B (e.g. a random access memory, or RAM) may be output by the access map memory 40 to the shifter 42. Each entry in the map RAM 40B may include the access map (symbols for each cache block in the access region, labeled AM in FIG. 2) and may optionally include state associated with the access map (labeled St in FIG. 2). Exemplary state for various embodiments will be described in more detail below.

The access patterns in the access pattern memory 44 may be centered on an access point, which may be in approximately the center of the access pattern. That is, the access point may be one position to the right or the left of the exact middle of the access pattern, since the access pattern may be an even number of symbols long and the exact middle is between the two symbols. If the access pattern is an odd number of symbols, the access point may be the center of the pattern. By placing the access point in the center, the patterns may permit both forward and reverse patterns of accesses to be detected. A forward pattern may be progressing at increasingly larger offsets within the access map (viewing the access map offset as a number), whereas a reverse pattern may be progressing at decreasingly smaller offsets. Furthermore, matches to symbols on both sides of the access point may be permitted to capture unusual access patterns.

Accordingly, based on the access map offset of the input VA, the shifter 42 may shift the access map to align the current access point of the access map to the access point in the pattern memory 44. The shifted access pattern may be provided to the access pattern memory 44, which may compare the shifted access pattern to the patterns. The access pattern memory 44 may thus be a read-only memory (ROM) with comparison circuitry, a CAM, or a combination of ROM and CAM if some access patterns are hardcoded and others are programmable. If a pattern is matched, the matched pattern may be output by the access pattern memory 44 to the control circuit 46. The control circuit 46 may be configured to generate one or more prefetch requests based on the matched pattern and may transmit the prefetch requests to the prefetch queue 26. In the illustrated embodiment, the access pattern memory 44 may include L+1 entries, storing L+1 access patterns labeled P0 to PL in FIG. 2.

A given access map may match more than one pattern in the pattern memory 44. Longer patterns (patterns having the most demand-accessed and/or successfully prefetched cache blocks) may be more likely to generate accurate prefetches. In an embodiment, the patterns in the pattern memory 44 may be sorted so that the longer patterns are nearest one end of the memory (e.g. the "top", where pattern P0 is stored, or the "bottom", where pattern PL is stored). The pattern memory 44 may include a priority encoder that selects the match nearest the top, or nearest the bottom, if there is more than one match. In this manner, the longest pattern that is matched may be naturally selected from the pattern memory 44 and provided to the control circuit 46.

In addition to generating the prefetch requests, the control circuit 46 may be configured to update the hitting access map in the access map memory 40. The update may, in some cases, be affected by the cache hit/miss result and thus the cache hit/miss from the data cache 30 may be received by the control circuit 46. In the event of a miss on the access map memory 40, the prefetch unit 20 may allocate an access map entry to the virtual address and may begin tracking the access map in the allocated entry.

Figure 3:
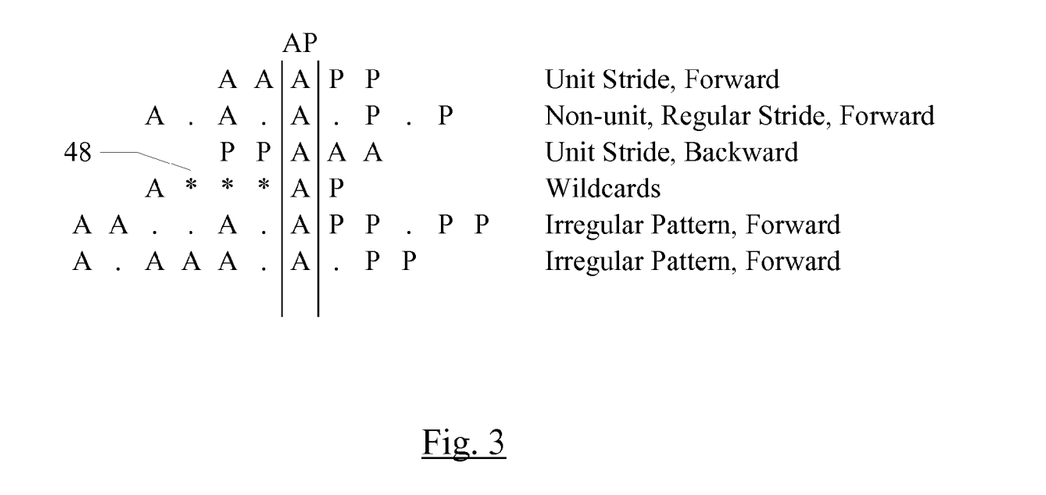
FIG. 3 is a diagram illustrating exemplary patterns to be matched.

FIG. 3 illustrates various examples of access patterns that may be represented in the access pattern memory 44 according to one embodiment of the prefetch unit. The access point (AP) is illustrated with a heading of AP and two vertical lines separating the symbol at the access point from the other symbols. The access patterns may use the same set of symbols that are used in access maps, including the ".", P, A, and S symbols (although no S symbols are used in the examples of FIG. 3).

The first pattern shown is a simple unit stride pattern as may be detected by a stride based prefetcher. In this case, the pattern is forward and thus the A symbols are on the left and the P symbols are on the right. To match this pattern, the three A symbols would need to be matched to the access map. If a match on this pattern is detected, the control circuit 46 may be configured to generate two prefetch requests, one at the access point plus one cache line and one at the access point plus two cache lines. If the access map already included one P, the other prefetch request may be generated. If both Ps were already in the access map, no additional prefetch requests may be generated.

The second pattern shown is a non-unit stride, but still a regular stride, in the forward direction. In this example, the stride is two. If a match on this pattern is detected (by matching the three As and the intervening "." symbols as well), the control circuit 46 may be configured to generate two prefetch requests, one at the access point plus two cache lines and one at the access point plus four cache lines. Like the first pattern, if a given P is already in the access map, the other prefetch request may be generated and no prefetch requests may be generated if both Ps are already in the access map.

The third pattern show is a unit stride pattern in the backward direction, again two prefetches would be generated if the pattern is matched by the three As, two prefetch requests would be generated (one at the access point minus one cache line, the other at the access point minus two cache lines). Like the first pattern, if a given P is already in the access map, the other prefetch request may be generated and no prefetch requests may be generated if both Ps are already in the access map.

The first three patterns in FIG. 3 illustrate patterns that a stride-based prefetcher may be able to detect. However, the control over the number of prefetches that are generated may be more precise using the patterns. In an embodiment, if there are N matching As and/or Ss in a pattern, there may be N–1 Ps in the pattern. Thus, as the pattern length is longer, the confidence in the pattern to generate accurate prefetches may increase.

In addition, a wildcard symbol may be included in the patterns. For example, the fourth pattern shown may include three wildcard symbols, illustrated as "*" in FIG. 3 (e.g. at reference number 48). The wildcard pattern may match any symbol in an access map. The wildcard patterns may increase the flexibility of the access patterns, in an embodiment. For example, in an out-of-order processor, the demand accesses may occur in a variety of orders based on operand availability, execution resource availability, and other dynamic factors. The varying order of accesses creates noise near the access point, referred to by the inventors as the "noisy wave front." Without wildcards, accurately matching such access maps to access patterns may be more complicated. Multiple access patterns might have to be included, to capture all the possible orders, for example, limiting the number of unrelated access patterns that may be included in a given size of memory.

Another case in which wildcard symbols in access patterns may be useful is to capture access maps in which unusual orders of accesses are performed by the code (even if executed approximately in order), even though the final access patterns may be regular (e.g. all the cache blocks in a range of the access map may be touched, or a predictable group may be touched). Wildcard symbols may be used for the unusual ordered accesses in such cases.

In one embodiment, access patterns that include wildcards may include fewer Ps, since the confidence in the accuracy of the pattern match may not be as high. For example, only the actual As in the access pattern may be counted in determining how many Ps to include. Alternatively, the wildcard symbols may be counted at a discounted weight (e.g. ½, ⅓, etc.).

Figure 4:
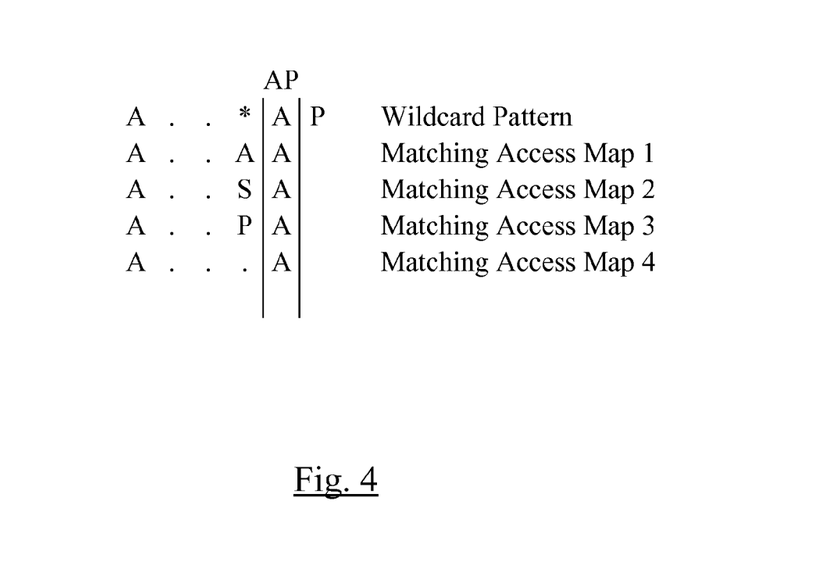
FIG. 4 is a diagram illustrating a pattern including a wild card and the matching patterns.

As mentioned, a wildcard symbol may match any symbol at the same point in an access map. Accordingly, multiple access maps may match a pattern that includes a wildcard symbol. FIG. 4 is an example of an access pattern with one wildcard symbol, an the four access maps which would match that access pattern.

Another type of pattern that may be used is an irregular pattern. The last two patterns illustrated in FIG. 3 are examples of irregular patterns. Generally, an irregular pattern may be any access pattern which is predictable, but is not accurately described with a stride. That is, the actual cache blocks accessed by the instruction code being executed are irregularly spaced, but are still predictable. Access maps with irregular patterns may be detectable in the pattern memory 44, and may be accurately predicted for prefetches. Wildcard patterns may also be used to aid in detecting irregular patterns as well, as mentioned above.

Figure 5:
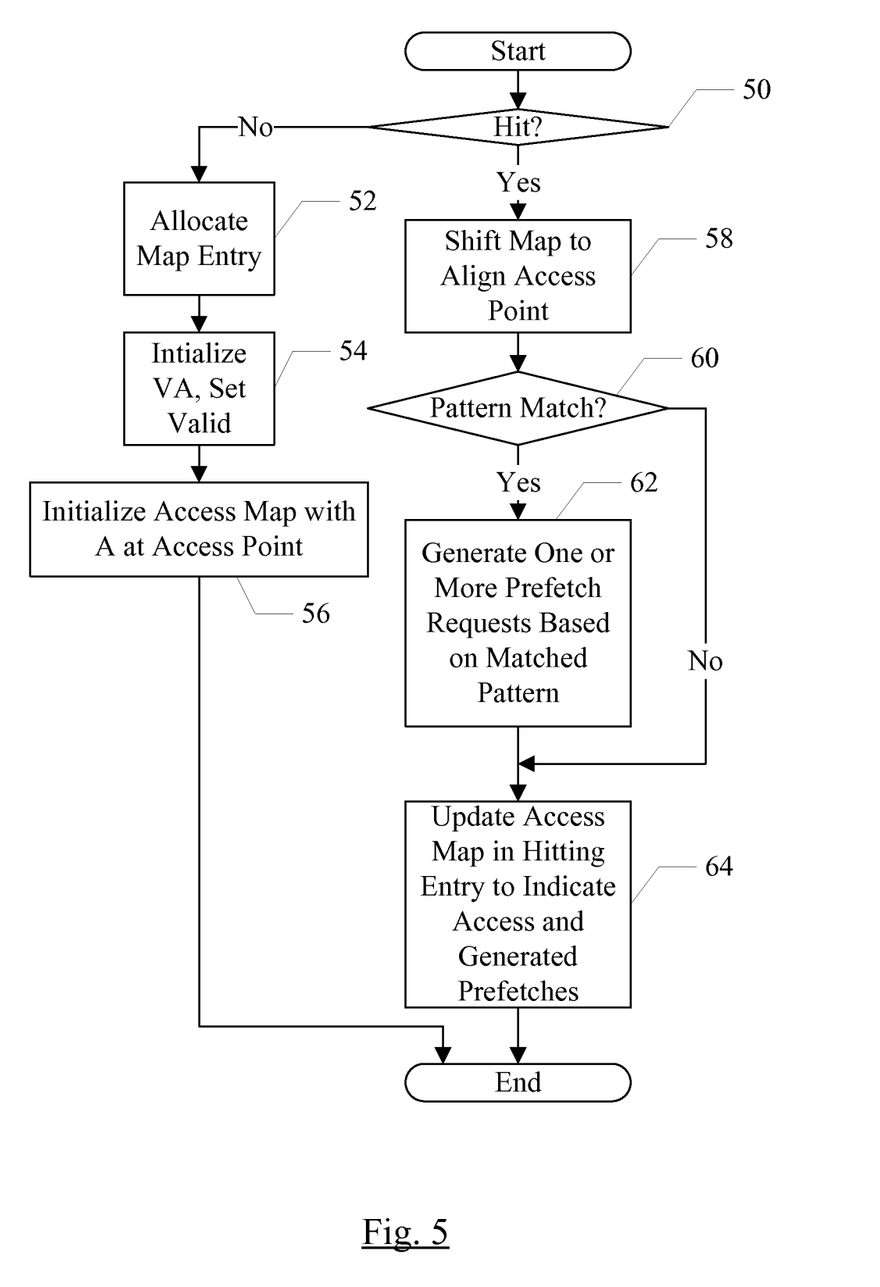
FIG. 5 is a flowchart illustrating operation of one embodiment of the prefetch unit shown in FIG. 2.

Turning next to FIG. 5, a flowchart is shown illustrating operation of one embodiment of the prefetch unit 20, and more particularly the control circuit 46, in response to a virtual address received by the prefetch unit 20 (in parallel with the address accessing the data cache 30). While the blocks are shown in a particular order for ease of understanding, other orders may be used. Blocks may be performed in parallel in combinatorial logic in the prefetch unit 20/control circuit 46. Blocks, combinations of blocks, and/or the flowchart as a whole may be pipelined over multiple clock cycles. The prefetch unit 20/control circuit 46 may be configured to implement the operation shown in FIG. 5.

The virtual address (or the access map tag portion of the address) may be presented to the access map memory 40. If the virtual address is a miss in the access map memory 40 (decision block 50, "no" leg), the control circuit 46 may be configured to allocate an entry in the access map memory 40 for the access region containing the virtual address (block 52). Any sort of allocation scheme may be used. For example, the control circuit 46 may maintain least recently used (LRU) data over the access map entries, and may replace the LRU entry if there are no invalid entries to be allocated. Various pseudo-LRU schemes may be used, or a random replacement may be used. The control circuit 46 may initialize the tag portion of the allocated entry (in the tag CAM 40A) with the virtual address of the access region (e.g. bits M:P+1 of the VA) and may set the valid bit (block 54). Additionally, the control circuit may initialize the access map portion of the entry (in the map RAM 40B) with a clear access map (e.g. all invalid) except for an A at the access point indicated by the access map offset (bits P:N of the VA) (block 56). The state field associated with the access map may also be initialized, if included.

If the virtual address is a hit in the access map memory 40 (decision block 50, "yes" leg), the access map memory 40 may output the corresponding access map to the shifter 42. The shifter 42 may shift the access map to align the access point (the offset to the accessed cache block in the access region—block 58). The shifted pattern output by the shifter 42 may be compared to the access patterns in the access pattern memory 44. If there is a match on a pattern (decision block 60, "yes" leg), the control circuit 42 may be configured to generate one or more prefetch requests based on the Ps in the matched pattern and further based on any previously generated prefetches recorded in the access map (block 62). That is, a previously generated or issue prefetch may not be generated again.

The control circuit 46 may also update the access map in the hitting entry of the access map memory 40, independent of whether the access map matches a pattern in the access pattern memory 44 (block 64). In the present embodiment, the control circuit 42 may update the access map to indicate the current access as well as any generated prefetch requests. If the access map has an invalid symbol (".") at the access point and the access is a demand access, the "A" symbol may be inserted at the access point. If the access map has a prefetch symbol ("P") at the access point and the access is a demand access that hits in the data cache 30, the "S" symbol may be inserted at the access point. If the access map has an invalid symbol (".") at the access point and the access is a prefetch request, the "P" symbol may be inserted at the access point. The generated prefetches may be indicated at their respective points in the access map. In another embodiment, only the present access may be recorded in the access map, and prefetch requests may be recorded when subsequently presented to the data cache 30.

In some embodiments, the prefetch unit 20 may support chained entries to manage a large stream of accesses. A stream of accesses may be a series of related accesses (e.g. generated from the same executing thread, such as a loop in the code) that is accessing data over a large memory foot print (e.g. two or more access map regions). Frequently, a stream may step through the footprint accessing the data, but may not return to previously visited data very often. If a stream spreads over multiple access regions, the stream may occupy multiple entries in the access map memory 40, potentially dislodging other useful access maps. Chained entries may be used to more efficiently handle streams in the access map memory 40, accurately prefetching for the streams while also maintaining potentially many other access maps. In an embodiment, a stream may be detected according to a stream threshold, which may be compared to an access map length. The stream threshold may be fixed or programmable. An access map length may refer to at least a number of demand-accessed cache blocks in an access map (i.e. "A" symbols), and may in some cases further include successful prefetches as well (i.e. "S" symbols). Similarly, a pattern length of an access pattern in the access pattern memory 44 may refer to at least a number of demand-accessed cache blocks in an access map (i.e. "A" symbols), and may in some cases further include successful prefetches as well (i.e. "S" symbols).

Once the prefetch unit 20 identifies a stream, the prefetch unit may allocate a chained entry to the stream. The chained entry may include at least a pair of entries, and may include more than a pair if desired to retain sufficient stream history. A pair will be used as an example herein, however. The pair of chained entries may be used to track the access map, and may be reused as the stream progresses across access regions instead of allocating new access map entries to track the stream. In this manner, the consumption of access map entries by a stream may be limited and the displacement of unrelated access maps from the access map memory 40 may similarly be limited.

Figure 6:
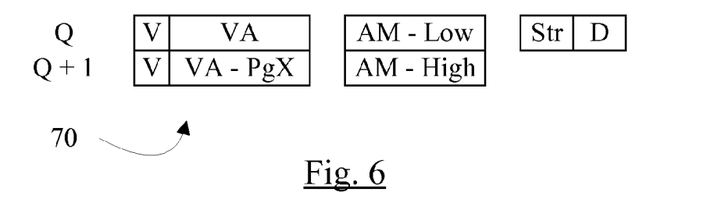
FIG. 6 is a block diagram illustrating one embodiment of a pair of access map entries that may be linked for chaining a stream.

FIG. 6 is a block diagram of one embodiment of a pair of chained entries 70, entry Q and entry Q+1. Thus, the entries may be adjacent entries in the access map memory 40. Other embodiments need not employ adjacent entries. In an embodiment, pairs of adjacent entries throughout the memory 40 may be used to track streams. In another embodiment, a subset of the entries in the memory 40 may be paired and may be used for tracking streams. In either case, the pair of entries may be individually used to track non-stream access maps if a stream is not being tracked. In still other embodiments, the chained entries 70 may be implemented separate from the entries in the memory 40, and may be used only for stream access map tracking.

As shown in FIG. 6, the entry Q may include the valid bit and the VA tag in the tag portion of the entry. In an embodiment, the least significant bit of the VA tag (bit P+1 in FIG. 2) may be ignored for tag comparisons with the input VA if the entry is being used for a stream. The entry Q may also include the low portion of the access map (the portion for which bit P+1 is zero). The high portion may be stored in the entry Q+1. The state in the entry Q may include a stream bit (Str), which may be set to indicate that a stream is detected, and may include a direction bit (D). The direction may indicate if the stream is forward (numerically increasing addresses) or reverse (numerically decreasing addresses). If the stream is forward, the access map would be expected to overflow the upper end of the high access map and wrap back to the low access map. If the pattern is reverse, the access map would be expected to overflow the lower end of the low access map and wrap back to the upper end of the high access map.

The tag field of the second entry (Q+1) may be used to store the virtual address of the next page in the virtual address space after the current page. The next page may be one page higher in the address space (e.g. VA+1 page), if the stream is forward, or may be one page lower in the address space (e.g. VA−1 page), if the stream is reverse. The size of the page may vary from embodiment to embodiment. For example, page sizes of 4 kB, a multiple of 4 kB, 1 megabyte (MB), 2 MB, 4MB, etc. may be used, or larger or smaller page sizes may be used.

Figure 7:
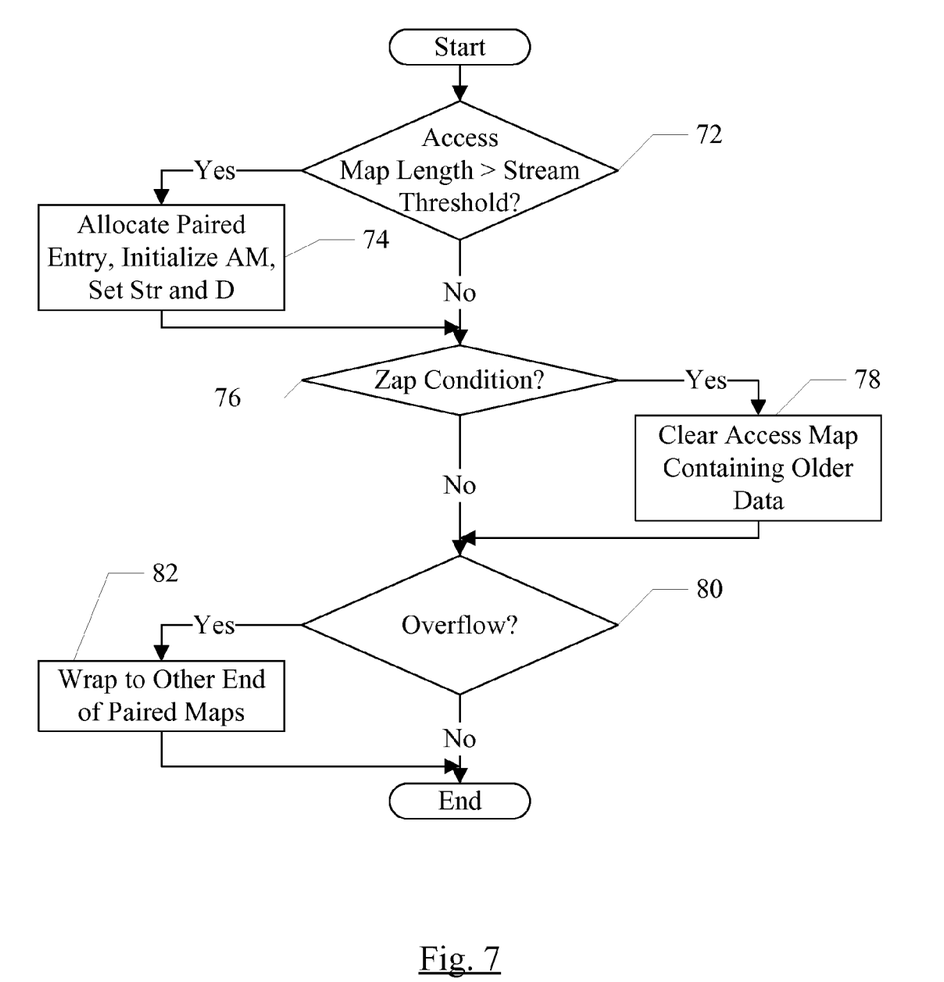
FIG. 7 is a flowchart illustrating operation of one embodiment of the prefetch unit shown in FIG. 2 for chaining a stream.

FIG. 7 is a flowchart illustrating operation of one embodiment of the prefetch unit 20, and more particularly the control circuit 46, in response to a hit on an entry in the access map memory 40 for a virtual address received by the prefetch unit 20 (in parallel with the address accessing the data cache 30). Other operations, e.g. as illustrated in FIG. 5 and discussed above, may also be performed. While the blocks are shown in a particular order for ease of understanding, other orders may be used. Blocks may be performed in parallel in combinatorial logic in the prefetch unit 20/control circuit 46. Blocks, combinations of blocks, and/or the flowchart as a whole may be pipelined over multiple clock cycles. The prefetch unit 20/control circuit 46 may be configured to implement the operation shown in FIG. 7.

The control circuit 46 may determine if the length of the access map is greater than the stream threshold (decision block 72), thus identifying a stream. If so (decision block 72, "yes" leg), the control circuit 46 may be configured to allocate the paired entry to the current entry and may chain the paired entries for the stream (block 74). The control circuit 46 may initialize the access map in the paired entry, and may set the streaming and direction fields in the state of the current entry based on the detected stream.

The control circuit 46 may also be configured to determine when to discard old data in the paired entries. The old data may be related to an access map region that has already been completed for the stream. Because the accesses in the stream may not necessarily proceed in a monotonic fashion through the access map, discarding old data too early may result in loss of information that may still be useful for predicting prefetches. On the other hand, discarding the old data so that it does not affect the accuracy of newer prefetches may also be an important factor. Various schemes for discarding the older data may be implemented. Discarding the older data is referred to herein as "zapping" the data.

One scheme may be to clear the access map in one of the paired entries in response to recording the first new access in that entry (i.e. after wrapping from the other end of the paired entries). This scheme may be referred to as "zap on return," since the older data is discarded when the wrap occurs. Another scheme may be to overwrite the data with new data, but only zap the old data (that has not been overwritten), when a cache miss is detected for an access and it hits an "S" state in the access map. Another scheme may be a full coherent scheme in which any evictions from the cache are checked against the access map memory 40 to ensure that the change in cache state of the block is reflected in the access map (e.g. an eviction may be set to the invalid symbol).

If the control circuit 46 detects a zap condition according to the implemented zap scheme (decision block 76, "yes" leg), the control circuit 46 may be configured to clear the access map (low or high) that contains the older data (block 78). Clearing the access map may refer to setting the symbol for each cache block to invalid.

If a given access overflows from one end of the paired entries, as indicated by the direction field in the state (decision block 80, "yes" leg), the control circuit 46 may wrap to the other end of the paired entries (block 82). As mentioned above, in some embodiments, the wrap may also be a zap condition and may cause the access map to which the wrap occurs to be cleared.

As mentioned previously, longer sequences of accesses (and particularly repeating regular patterns in a longer sequence) may be more accurate for predicting prefetches than shorter sequences and/or less regular patterns. Accordingly, some of the access patterns in the access pattern memory 44 are long to generate prefetches with high accuracy. However, longer access maps take longer to generate (to match with the longer access patterns), since multiple accesses need to be recorded to build a longer access map. Therefore, shorter access patterns may be included in the access pattern memory 44. The shorter access patterns may be matched earlier in a sequence of accesses (e.g. by a shorter access map) to generate prefetch requests earlier in the sequence. On average, the shorter patterns may perform reasonably well in accurately predicting prefetches. However, in some cases, a short access pattern may not be effective.

Figure 8:
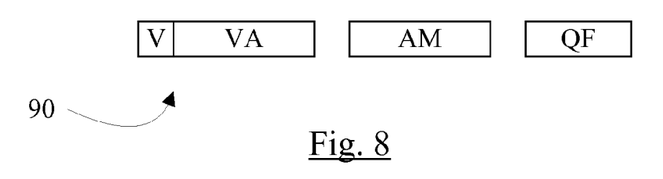
FIG. 8 is a block diagram illustrating one embodiment of a quality factor.

In some embodiments, the state field in each access map entry may store a quality factor. Such an entry 90 is illustrated in FIG. 8, which shows the virtual address tag, the access map, and a quality factor (QF). Embodiments which also implement that chained entries for streams may include the Str and D bits in the state field as well, not shown in FIG. 8.

The quality factor may be a value that measures or estimates the effectiveness of the prefetching for the corresponding access map. The quality factor may be used to further limit or prevent prefetching (above what the pattern itself already limits) when the effectiveness is not high. Additionally, in some embodiments, the quality factor may be used to "meter" prefetching that is effective but that is being consumed slowly. That is, using the quality factor to limit the prefetching may result in prefetched data being delivered closer to the time at which the data will be consumed by demand fetches. The scheduling of memory accesses in the memory system may be more efficient in some cases, since the prefetch traffic may be less bursty and thus the congestion in the memory system may be lower.

As mentioned above, longer access patterns may tend to be more accurate in predicting prefetches, and so the quality factor may not be used if the access map length exceeds a threshold. The threshold may be fixed or programmable in the prefetch unit, in some embodiments.

In an embodiment, the quality factor may be a token-based or credit-based mechanism. The tokens/credits may represent an allowable amount of outstanding prefetching. Accordingly, tokens/credits may be consumed when a prefetch request is generated (and a prefetch request may only be generated is sufficient tokens/credits are available). A successful prefetch may return the tokens/credits to the quality factor value, and the passage of time may also return tokens/credits to the value. Accordingly, the rate at which prefetch requests are generated may be reduced if the prefetches are not consumed by demand fetches.

Figure 9:
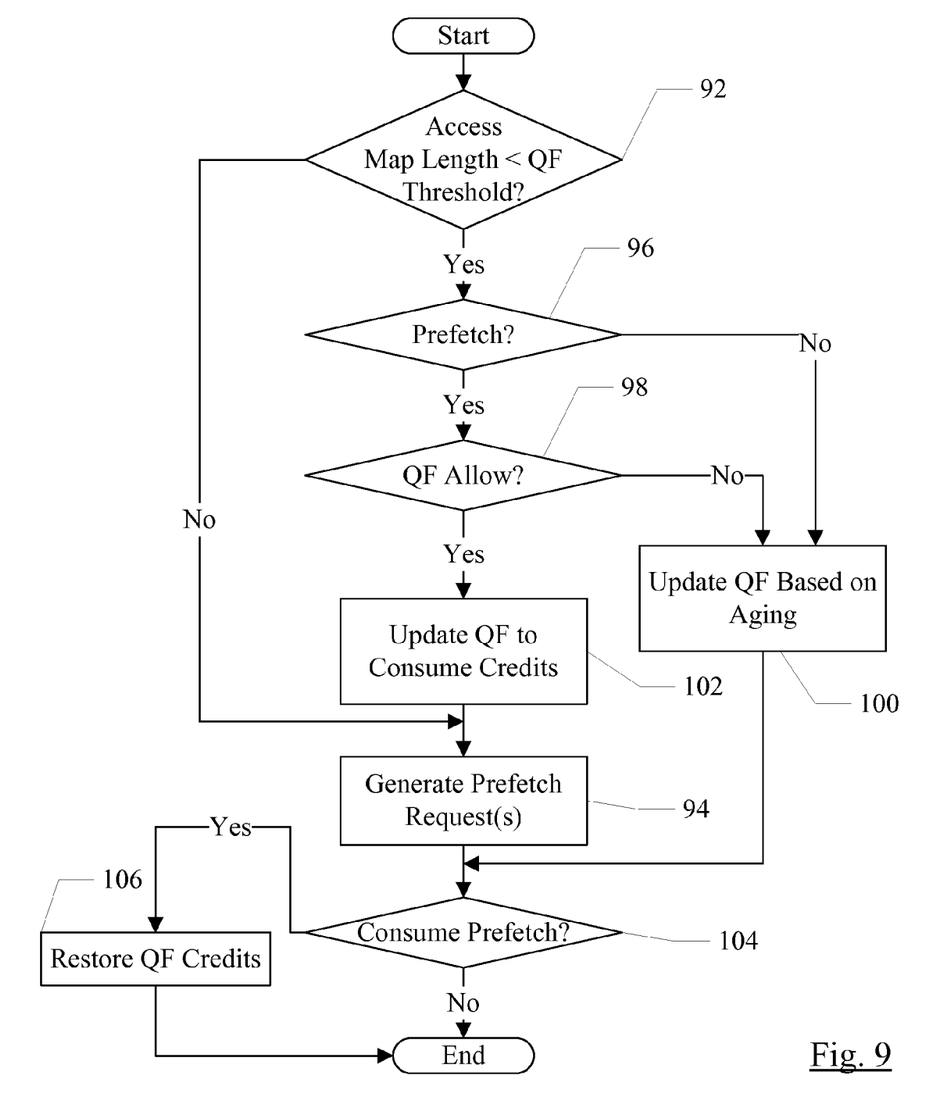
FIG. 9 is a flowchart illustrating operation of one embodiment of the prefetch unit shown in FIG. 2 for using a quality factor.

FIG. 9 is a flowchart illustrating operation of one embodiment of the prefetch unit 20, and more particularly the control circuit 46, in response to a pattern match in the access pattern memory 44 for an access map when quality factors are used. Other operation, e.g. as illustrated in FIG. 5 and discussed above, may also be performed. While the blocks are shown in a particular order for ease of understanding, other orders may be used. Blocks may be performed in parallel in combinatorial logic in the prefetch unit 20/control circuit 46. Blocks, combinations of blocks, and/or the flowchart as a whole may be pipelined over multiple clock cycles. The prefetch unit 20/control circuit 46 may be configured to implement the operation shown in FIG. 9.

If the access map length is greater than the quality factor threshold (decision block 92, "no" leg), the quality factor is not used for the access map. The prefetch request(s) may be generated as indicated in the access map (block 94). If the access map length is less than the quality factor threshold, but the indicated prefetch requests have already been generated or there are not enough credits/tokens available to generate a prefetch request (decision block 92, "yes" leg and either decision block 96, "no" leg or decision block 98, "no" leg), there is no prefetch request to be generated. The control circuit 46 may be configured to update the quality factor based on aging/passage of time (block 100). If there are prefetch request(s) to be generated and there are sufficient tokens/credits (decision blocks 92, 96, and 98, "yes" legs), the control circuit 46 may be configured to update the quality factor to consume the credits/tokens for a prefetch request or requests (block 102) and may be configured to generate the indicated and permitted prefetch request(s) (block 94).

Additionally, if a prefetch is consumed by a demand fetch (changing a "P" symbol to an "S" symbol in the access map—decision block 104, "yes" leg), the control circuit may be configured to update the quality factor to restore the number of credits/tokens consumed for the prefetch request (block 106).

The number of credits/tokens consumed for a prefetch request and restored for a successful prefetch, and the number of credits/tokens restored with the passage of time, may vary in various embodiments. In one example, the quality factor may be initialized to 100 credits/tokens and 100 may be the maximum in the quality factor. A prefetch request may consume 25 credits/tokens and a successful prefetch may restore 25 credits/tokens. Credits/tokens may be restored at a rate of one credit/token per clock cycle for the passage of time.

System

Figure 10:
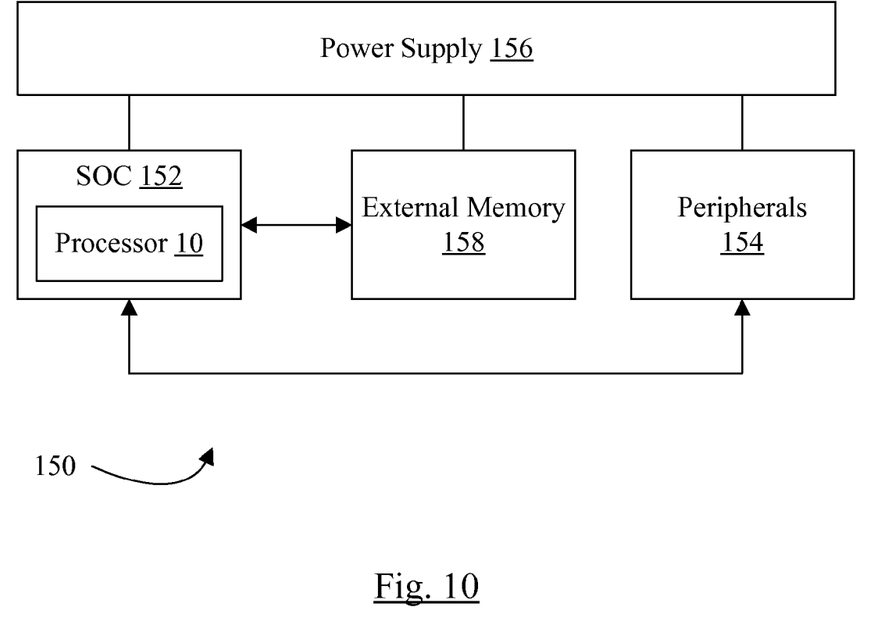
FIG. 10 is a block diagram illustrating one embodiment of a system.

Turning next to FIG. 10, a block diagram of one embodiment of a system 150 is shown. In the illustrated embodiment, the system 150 includes at least one instance of an system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 10 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A prefetch unit comprising:
   a first memory configured to store a plurality of addresses and a corresponding plurality of access maps, wherein each access map of the plurality of access maps records accesses to a plurality of cache blocks within a defined region associated with a corresponding address of the plurality of addresses, wherein the first memory is configured to output a given access map of the plurality of access maps responsive to an access to a data cache at an access address within the defined region associated with a given address of the plurality of addresses;
   a second memory configured to store a plurality of access patterns to be compared to the given access map, wherein at least a first access pattern of the plurality of access patterns includes at least one wild card symbol that is defined to match any access at the corresponding cache block in the given access map; and a control circuit configured to generate one or more prefetch requests responsive to the given access map matching the first access pattern, including matching any access at the corresponding cache block to the wild card symbol.

2. The prefetch unit as recited in claim 1 wherein the first access pattern further includes one or more access symbols indicating one or more cache blocks accessed by demand accesses.

3. The prefetch unit as recited in claim 2 wherein the first access pattern further includes one or more successful prefetch symbols indicating one or more cache blocks that were prefetched and subsequently demand-accessed.

4. The prefetch unit as recited in claim 3 wherein the first access pattern further includes one or more invalid symbols indicating no access to one or more cache blocks.

5. The prefetch unit as recited in claim 1 wherein a second access pattern of the plurality of access patterns is an irregular pattern that cannot be accurately described by a stride.

6. The prefetch unit as recited in claim 1 wherein the control circuit is configured to detect a stream of accesses that cross a plurality of access regions, wherein the control circuit is configured to allocate a pair of access maps in the first memory to track the stream, and wherein the control circuit is configured to re-use the pair of access maps as the stream crosses access region boundaries instead of allocating new access maps to the stream.

7. The prefetch unit as recited in claim 6 wherein the control circuit is configured to clear previous data from one of the pair of access maps when re-using the one of the pair as the stream crosses the access region boundary.

8. The prefetch unit as recited in claim 1 wherein the control circuit is configured to track a quality factor indicating an accuracy of prefetching for a given access map, and wherein the control circuit is configured to control a number of prefetches generated responsive to the quality factor.

9. The prefetch unit as recited in claim 8 wherein the control unit is configured to override the quality factor responsive to a length of the access map exceeding a threshold.

10. The prefetch unit as recited in claim 8 wherein the quality factor is a credit count, wherein a first number of credits are consumed in response to generating a prefetch, and wherein the first number of credits are restored in response to a successful prefetch, and wherein a second number of credits are restored in response to a passage of time.

11. A prefetch unit comprising:
a first memory configured to store a plurality of addresses and a corresponding plurality of access maps, wherein each access map of the plurality of access maps records accesses to a plurality of cache blocks within a defined region associated with a corresponding address of the plurality of addresses, wherein the first memory is configured to output a given access map of the plurality of access maps responsive to an access to a data cache at an access address within the defined region associated with a given address of the plurality of addresses;
a second memory configured to store a plurality of access patterns to be compared to the given access map; and
a control circuit configured to generate one or more prefetch requests responsive to the given access map matching one of the plurality of access patterns, and wherein the control circuit is configured to detect a stream of access in the given access map, and wherein the control circuit is configured to allocate at least two access maps of the plurality of access maps to track the stream, and wherein the control circuit is configured to wrap from one of the at least two access maps to another one of the at least to access maps at each access region boundary crossing by the stream.

12. The prefetch unit as recited in claim 11 wherein the control circuit is configured to determine when to clear previous data from a first access map into which the stream is wrapping.

13. The prefetch unit as recited in claim 12 wherein the control circuit is configured to clear the previous data in response to recording an access subsequent to the wrap.

14. The prefetch unit as recited in claim 12 wherein the control circuit is configured to clear the previous data in response to detecting a cache miss on a successful prefetch from the previous data.

15. The prefetch unit as recited in claim 11 wherein a first address stored corresponding to the at least two access maps is compared to input addresses to the first memory to output the access maps, and wherein a second address corresponding to the at least two access maps permits a page crossing in the stream.

16. The prefetch unit as recited in claim 11 wherein the first memory is configured to store state corresponding to the at least two access maps, wherein the state includes an indication that the stream has been detected and a direction of the stream.

17. A prefetch unit comprising:
a first memory configured to store a plurality of addresses and a corresponding plurality of access maps, wherein each access map of the plurality of access maps records accesses to a plurality of cache blocks within a defined region associated with a corresponding address of the plurality of addresses, wherein the first memory is configured to output a given access map of the plurality of access maps responsive to an access to a data cache at an access address within the defined region associated with a given address of the plurality of addresses, and wherein the first memory is configured to store a plurality of quality factors, each quality factor corresponding to one of the plurality of access maps;
a second memory configured to store a plurality of access patterns to be compared to the given access map; and
a control circuit configured to generate one or more prefetch requests responsive to the given access map matching one of the plurality of access patterns, and wherein the control circuit is configured to limit a number of prefetch requests generated for the given access map responsive to the quality factor.

18. The prefetch unit as recited in claim 17 wherein the control circuit is configured to override the quality factor responsive to a length of the access map exceeding a threshold.

19. The prefetch unit as recited in claim 17 wherein the quality factor includes a plurality of tokens, and wherein a first number of tokens are consumed responsive to generating a prefetch, and wherein the first number of tokens are restored responsive to the prefetch being successful, and wherein the control circuit is configured to inhibit generating the prefetching responsive to the first number of tokens not being available.

20. The prefetch unit as recited in claim 19 wherein a second number of tokens are restored each clock cycle.

* * * * *

UNITED STATES PATENT AND TRADEMARK OFFICE
CERTIFICATE OF CORRECTION

| | | |
|---|---|---|
| PATENT NO. | : 9,015,422 B2 | Page 1 of 1 |
| APPLICATION NO. | : 13/942780 | |
| DATED | : April 21, 2015 | |
| INVENTOR(S) | : Stephan G. Meier et al. | |

It is certified that error appears in the above-identified patent and that said Letters Patent is hereby corrected as shown below:

In the Specification:

Column 6, Line 4, please delete "access pattern memory 46" and substitute -- access pattern memory 44 --

Column 10, Line 18, please delete "control circuit 42" and substitute -- control circuit 46 --

Column 10, Line 28, please delete "control circuit 42" and substitute -- control circuit 46 --

Column 14, Line 47, please delete "SOC 10" and substitute -- SOC 152 --

In the Claims:

Claim 9, Column 15, Line 38, please delete "control unit" and substitute -- control circuit --

Signed and Sealed this
Twenty-seventh Day of October, 2015

Michelle K. Lee
*Director of the United States Patent and Trademark Office*